US005249139A

United States Patent [19]

Blasius et al.

[11] Patent Number: 5,249,139

[45] Date of Patent: Sep. 28, 1993

[54] METHOD AND APPARATUS FOR DETECTING REGISTER ERRORS ON A PRINTED PRODUCT PROVIDED WITH REGISTER MARKS

[75] Inventors: Uda Blasius, Leimen; Manfred Korinek, Sinsheim; Jürgen Reithofer, Nussloch, all of Fed. Rep. of Germany

[73] Assignee: Heidelberger Druckmaschinen AG, Heidelberg, Fed. Rep. of Germany

[21] Appl. No.: 697,187

[22] Filed: May 8, 1991

[30] Foreign Application Priority Data

May 8, 1990 [DE] Fed. Rep. of Germany ....... 4014706

[51] Int. Cl.[5] ....................... G06F 15/46; B65H 23/00

[52] U.S. Cl. .................................. 364/526; 364/559; 364/471; 356/401

[58] Field of Search ............... 364/559, 561, 562, 563, 364/471, 525, 526, 469; 226/2, 3; 356/401, 400

[56] References Cited

U.S. PATENT DOCUMENTS 2,802,666 8/1967 Crosfield .............................. 226/16
3,609,753 9/1971 Albarda .............................. 341/155
4,135,664 1/1979 Resh .................................. 235/475
4,641,070 2/1987 Pfizenmaier et al. ............... 318/640
5,076,163 12/1991 Sainio ................................ 101/181

FOREIGN PATENT DOCUMENTS 1041976 10/1958 Fed. Rep. of Germany .
2643481 3/1978 Fed. Rep. of Germany .

*Primary Examiner*—Thomas G. Black
*Assistant Examiner*—Michael Zanelli
*Attorney, Agent, or Firm*—Herbert L. Lerner; Laurence A. Greenberg

[57] ABSTRACT

A method of detecting register errors on a printed product, includes forming register marks on the printed product, pressing the printed product through a printing machine, opto-electrically scanning the register marks twice in a web travel direction with a predetermined time interval between the scannings, generating respective signals in accordance with the scannings, subtracting the signals from one another to obtain a further signal, and determining the position of the register mark as a measure of a time-dependent position of an extreme value of the further signal; and apparatus for performing the method.

5 Claims, 7 Drawing Sheets

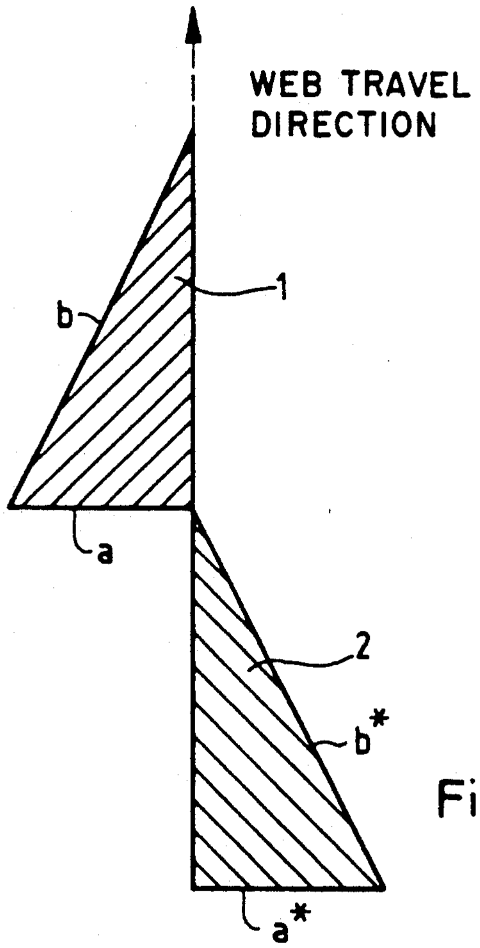
Fig. 1
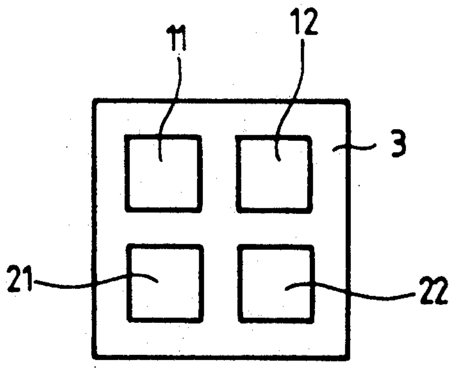
Fig. 2
Fig. 3A
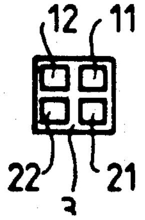
Fig. 3B
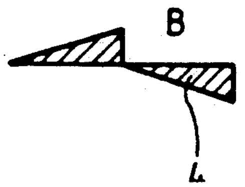
Fig. 3C
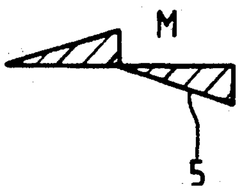
Fig. 3D
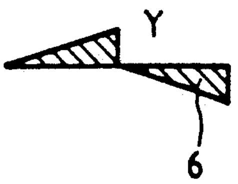

11
B
M
Y
t

12
B
M
Y
t

21
B
M
Y
t

22
B
M
Y
t 11-12
B
M
Y
t 21-22
B
M
Y
t

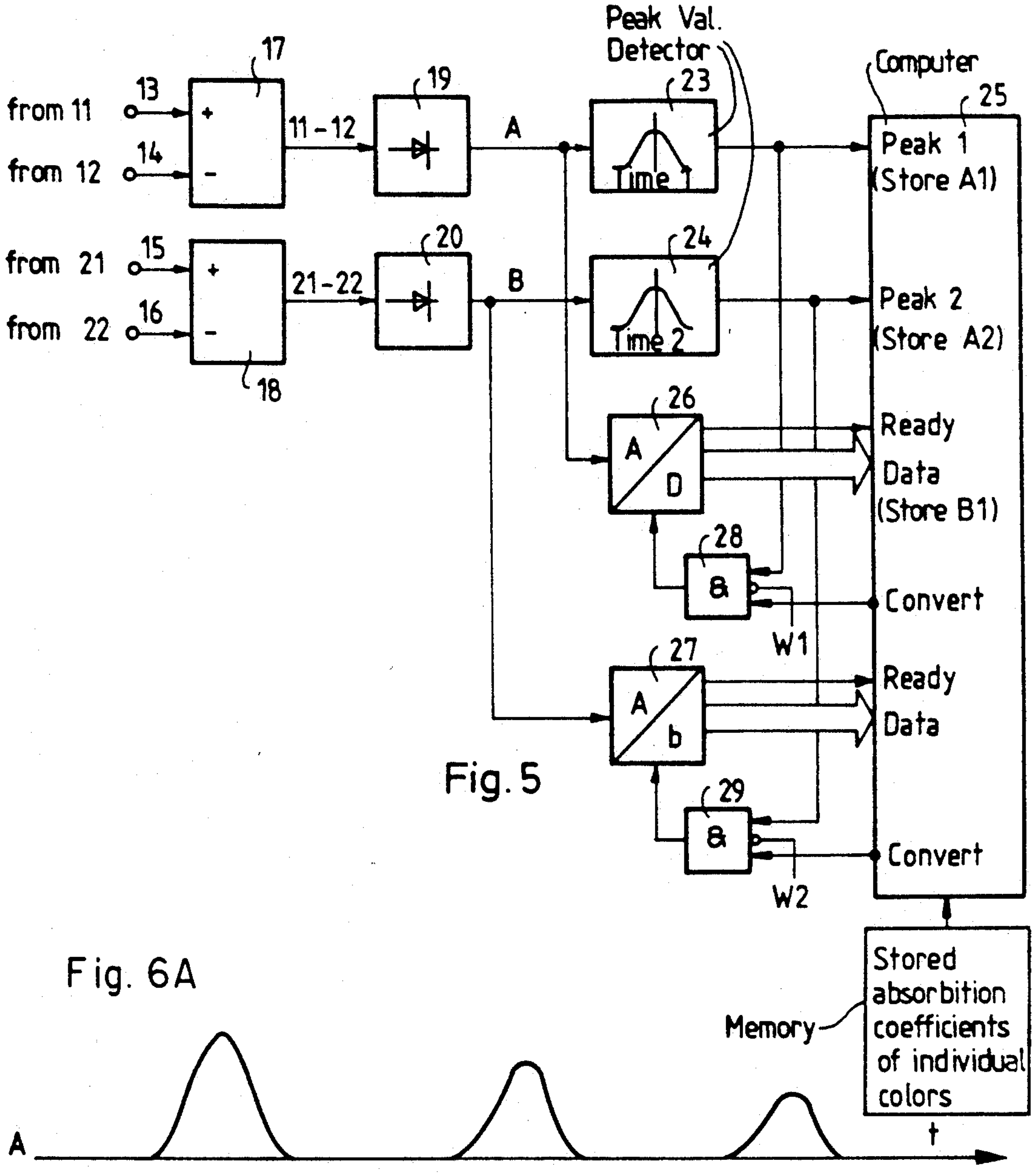
Fig. 5
Fig. 6A
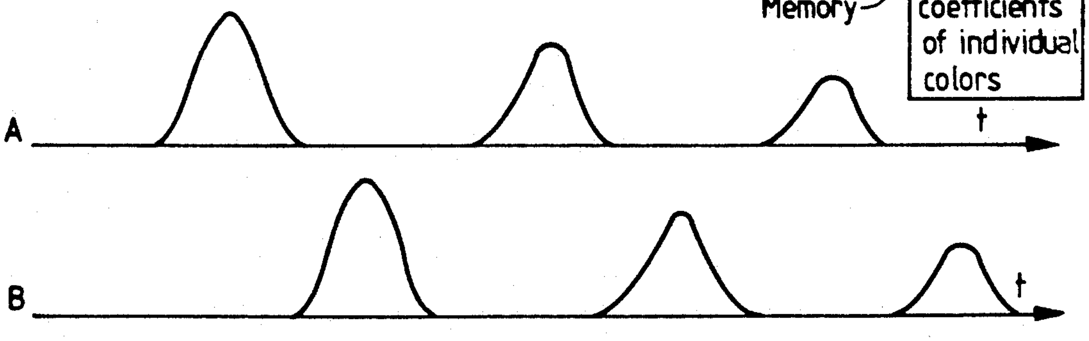
Fig. 6B

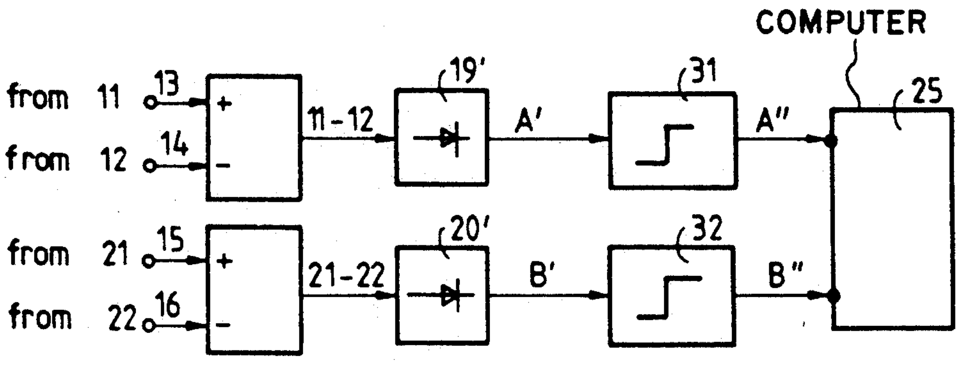
Fig.7
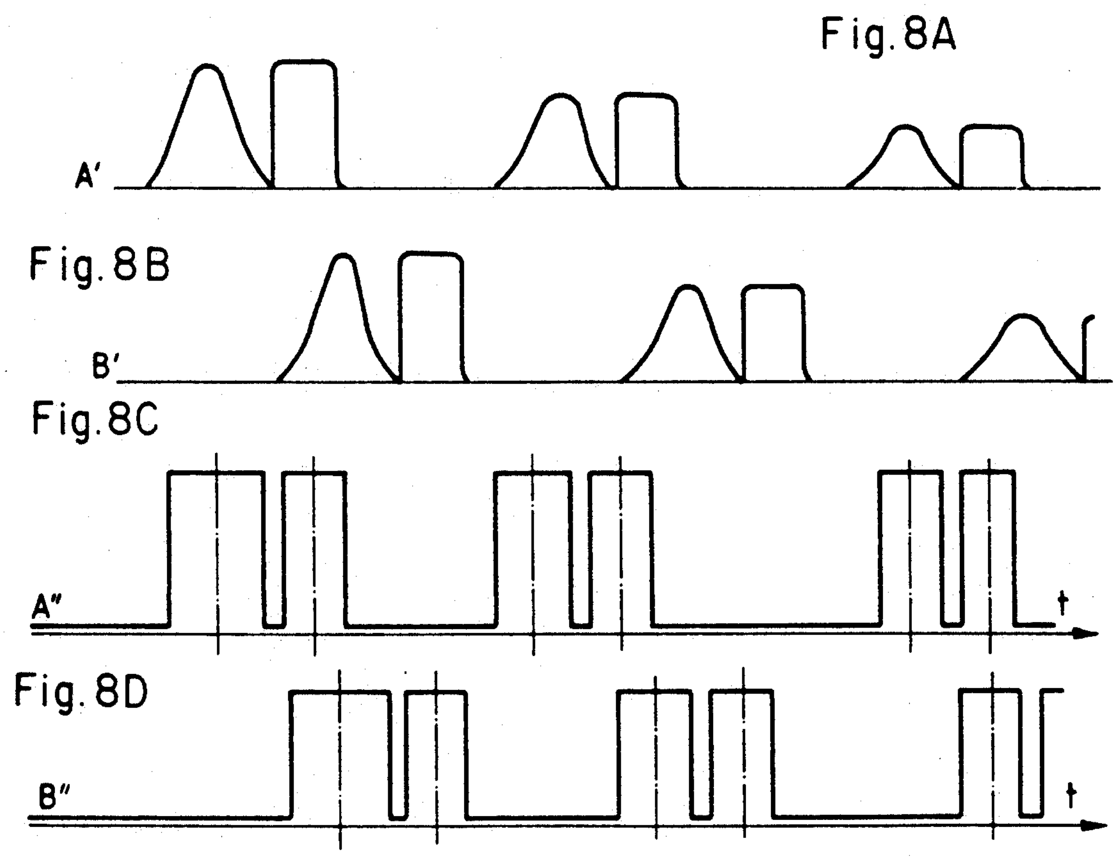

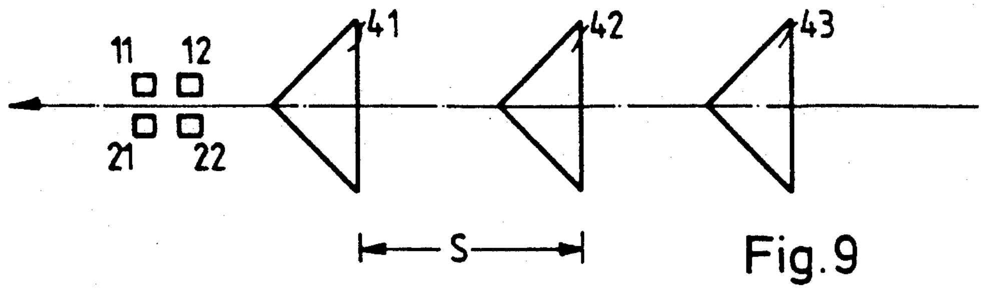
Fig. 9
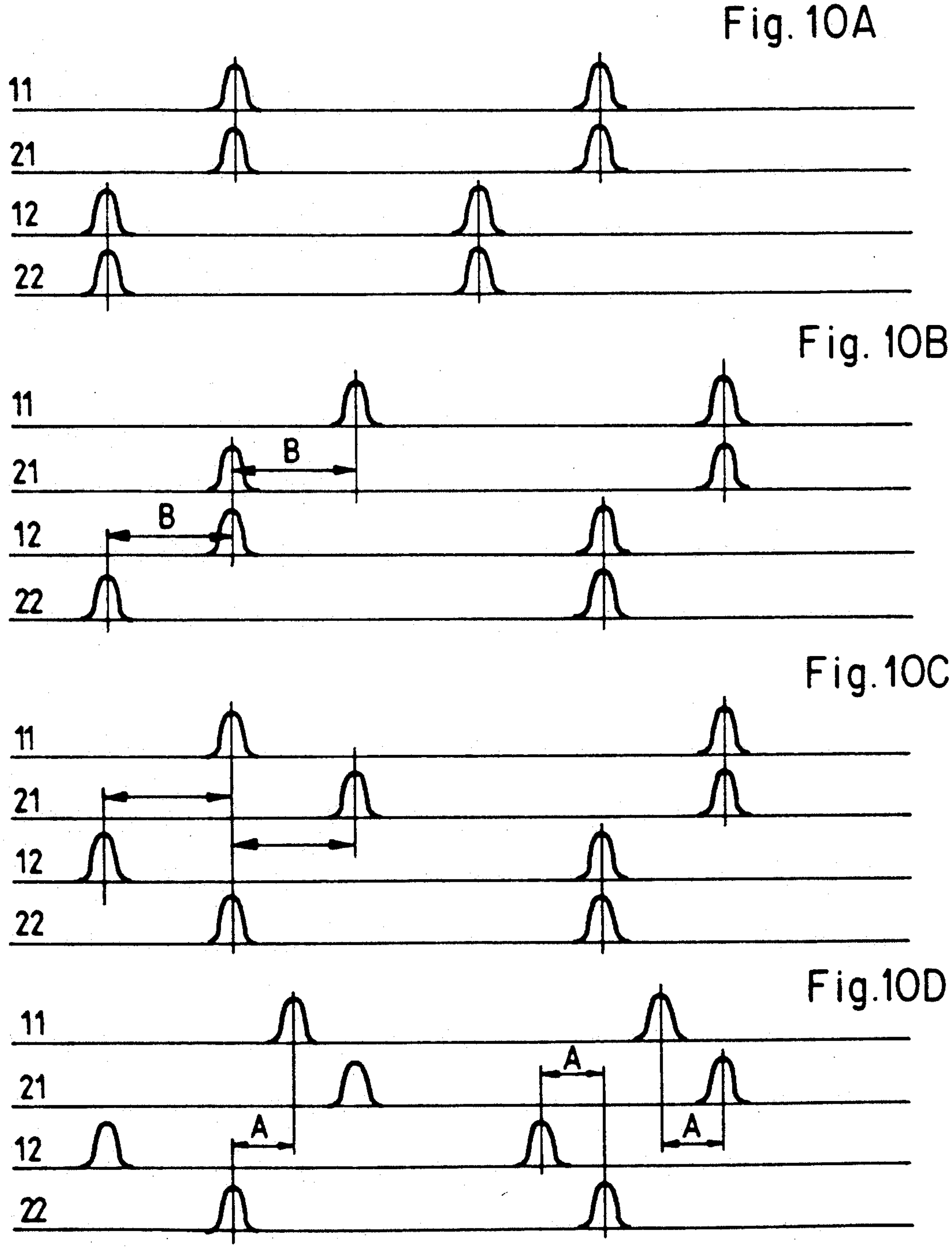
Fig. 10A
Fig. 10B
Fig. 10C
Fig. 10D

METHOD AND APPARATUS FOR DETECTING REGISTER ERRORS ON A PRINTED PRODUCT PROVIDED WITH REGISTER MARKS

The invention relates to a method and an apparatus for detecting register errors on a printed product provided with register marks, the register marks being opto-electrically scanned when the printed product is passed through a printing machine.

In a color printing operation, exact register of the individual color separations is indispensable. For the purpose of determining register errors, it has become known heretofore to provide the respective printed product with register marks. It has further become known heretofore to scan the register marks opto-electrically and to use the resulting information for register control. The electrical signals resulting from the opto-electrical scanning of the register marks have rise and fall or upwardly and downwardly sloping times, respectively, which can lead to inaccuracies during an analysis or evaluation of the signals.

It is accordingly an object of the invention to provide a method and apparatus for detecting register errors which are improvements over heretofore known methods and apparatus of this general type with respect to the accuracy and meaningfulness of the information obtained thereby.

With the foregoing and other objects in view, there is provided, in accordance with one aspect of the invention, a method of detecting register errors on a printed product, which comprises forming register marks on the printed product, passing the printed product through a printing machine, opto-electrically scanning the register marks twice in a web travel direction with a predetermined time interval between the scannings, generating respective signals in accordance with the scannings, subtracting the signals from one another to obtain a further signal, and determining the position of the register mark as a measure of a time-dependent position of an extreme value of the further signal.

In accordance with another mode of the invention, the method includes comparing the extreme value of the further signal with stored values representing absorption coefficients of various printing inks for obtaining a result indicating the color of the respective scanned register mark.

In accordance with another aspect of the invention, there is provided an apparatus for performing a method of detecting register errors on a printed product, comprising means for twice scanning in a web travel direction register marks formed on the printed product and generating two signals in accordance with the scannings, means for subtracting the signals from one another and deriving a further signal therefrom, circuit means including an analog-digital converter and a peak value detector connected to respective inputs of a computer, and means for feeding the further signal to the analog-digital converter and to the peak value detector, the peak value detector being effective for emitting a pulse to the computer when the further signal reaches a peak value.

In accordance with a further feature of the invention, the peak value detector has an output connected via an AND-circuit to a control input of the analog-digital converter, and the computer has an output connected to an input of the AND-circuit for feeding a start pulse thereto.

In accordance with an added aspect of the invention, there is provided an apparatus for scanning register marks comprising at least two opto-electrical sensor elements disposed at a predetermined spacing from one another in a web travel direction, and a subtraction circuit connected to the sensor elements for receiving output signals therefrom, the subtraction circuit having an output connected via a rectifier to an input of a threshold comparator.

In accordance with an additional feature of the invention, there is provided an apparatus having four opto-electrical sensor elements arranged in a square, and means for feeding the output signals of respective pairs of the sensor elements to respective subtraction circuits.

In accordance with a concomitant mode of the invention, the method includes forming each of the register marks with two edges extending with opposite angles obliquely to the web travel direction, the edges being offset from one another in the web travel direction.

Other features which are considered as characteristic for the invention are set forth in the appended claims.

Although the invention is illustrated and described herein as embodied in a method and apparatus for detecting register errors on a printed product provided with register marks, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing, in which:

FIG. 1 is a magnified view of a register mark;

FIG. 2 is an enlarged diagrammatic plan view of a sensor with four sensor elements;

FIGS. 3A–3D are views closer to actual scale of register marks marked for different colors which are scanned by the sensor of FIG. 2;

FIG. 5 is a block diagram of a system for performing one mode of the method according to the invention;

FIGS. 6A and 6B are plot diagrams of signals produced with the mode of the method according to the system of FIG. 5;

FIG. 7 is a block diagram of another system for performing another mode of the method according to the invention;

FIGS. 8A to 8D are plot diagrams of signals produced with the mode of the method according to the system of FIG. 7;

FIG. 9 is a view having a scale similar to that of FIG. 3 of a sensor and different register marks;

FIGS. 10A to 10D is a grouping of time-dependency diagrams of signals produced during the scanning of the register marks shown in FIG. 9;

Like parts are identified by the same reference characters in the figures of the drawing.

Figures 4A, 4B, 4C, 4D, 4E, 4F:
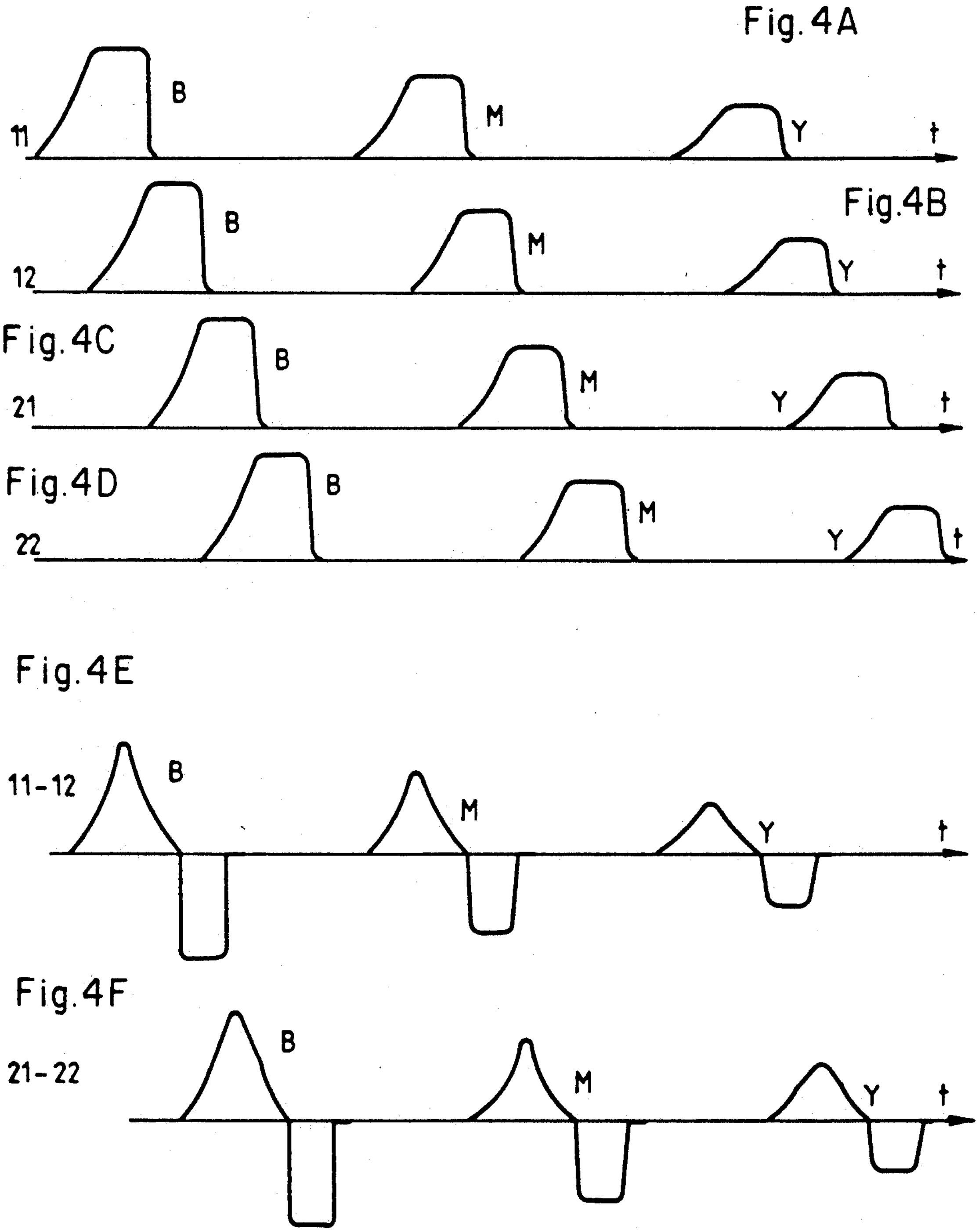
FIGS. 4A to 4F are plot diagrams of output signals of the sensor of FIG. 2 and differentiated signals formed from respective pairs thereof.

Referring further to the drawing and, first, particularly to FIG. 1 thereof, there is shown therein an advantageous register mark formed of two right triangles 1 and 2 which is so imprinted on a print sheet or signature that it moves in a direction of web travel indicated by an arrow. The register mark preferably has dimensions corresponding to those of conventional register marks and is very small compared to the size of the printed sheet. It thus takes up little space on the print sheet or signature and is not visible, for example, on a folded signature when it is disposed on a fold line thereof. The inclined or oblique edges b and b* permit the detection of a deviation in the time-dependent position of the signature, in a relatively simple manner, by scanning with the aid of a respective sensor. With the edges a and a*, a deviation in the position of the signature in the travel direction of the web can be detected by means of the same sensors.

FIG. 2 shows an arrangement of four sensor elements 11, 12, 21 and 22 in the form of a square. An arrangement of this kind is available on the market, for example from the Siemens Corporation—with the model designation SFH 204.

FIGS. 3A–3D illustrate the sensor 3, previously mentioned in connection with FIG. 2, as well as three register marks 4, 5 and 6 marked for different colors, for example, black (B), magenta (M) and yellow (Y), which are respectively imprinted, by a printing unit of a printing machine, on a web traveling in a direction towards the sensor 3. In order to be capable of measuring the position of the register marks with respect to one another, and therefore the register of the printed image, electrical signals are required which precisely conform with the respective positions of the register marks 4, 5 and 6. The signals emitted by the sensor 3, however, have edges or sides with a slope which depends upon the contrast of the respective color with paper white. In addition, due to the wedge shape, the upwardly sloping edge or side of the signals is flatter than the downwardly sloping edge or side thereof.

The output signals of the sensor elements 11, 12, 21 and 22 produced during the scanning of the register marks 4, 5 and 6 are represented in FIGS. 4A to 4F by means of time dependent or time diagrams wherein the individual horizontal lines respectively correspond to the specific sensor element designated and the individual pulses respectively correspond to the register mark colors designated, namely, B for black, M for magenta and Y for yellow. If the represented signals were converted into binary signals with the aid of a threshold-value comparator without any further measures, the leading sides thereof would be dependent upon the respective slope of the leading sides of the signals and thus upon the respective color.

This dependence is avoided by means of the circuit arrangement shown in FIG. 5. The output signals of the sensor elements 11, 12, 21 and 22 are fed to the inputs 13, 14, 15 and 16, respectively, after appropriate amplification, if necessary or desirable. The output signals of respective pairs of the sensor elements, which lie one behind the other in the direction of web travel, are subtracted in respective subtraction circuits 17 and 18. The signals 11–12 and 21–22 resulting therefrom are also represented in FIG. 4.

With the aid of the succeeding rectifiers 19 and 20 (FIG. 5), the negatively directed portions resulting from the subtraction are cut out, so that the signals A and B represented in FIGS. 6A and 6B are formed. These signals are transmitted to respective peak value detectors 23 and 24 which deliver a pulse PEAK1 and PEAK2, respectively, to a computer 25 at the instant of time the maximum value of the respective signals A and B is reached.

Independently of the color, the pulses PEAK1 and PEAK2 represent the instant of time at which the respective register mark occupies a predetermined position. These various instants of time are compared with one another or with a nominal value, respectively, in the computer 25, so that register is optimized through appropriate control of the printing machine.

In addition to being able to effect the color-independent determination of the position of the register marks, it is possible, with the circuit arrangement represented in FIG. 5, to determine the color of a respective register mark which has been scanned. For this purpose, the signals A and B are fed to a respective analog-digital converter 26 or 27. In order to convert the respective peak value into a digital signal, the analog-digital converters 26 and 27 are triggered with PEAK1 and PEAK2, respectively. For this purpose, a respective AND circuit 28, 29 is provided, to which the respective pulse PEAK1, PEAK2 is fed, on the one hand, and a CONVERT signal from the computer 25, on the other hand. This CONVERT signal defines a period of time in which the peak value can lie. Through this method, the conversion of peak values of other signals can be excluded.

The output signals of the analog-digital converters 26 and 27 are fed to corresponding inputs of the computer 25 and are compared thereat with stored values of the absorption coefficients of the individual colors. The result of this comparison provides information on the color of the respective register mark which has been scanned. This information can be used, for example, to feed the control signals, respectively, generated by the computer 25 to the appropriate printing unit.

In fact, for position control in the travel direction of the web, two sensor elements 11, 12 and 21, 22, respectively, are sufficient. In addition, the use of four sensor elements, with respectively two sensor elements thereof scanning one of the parts of the register marks 4, 5 and 6 (FIG. 1), permits control of the position transversely to the web and, if necessary or desirable, control in a diagonal or oblique direction, through appropriate analysis or evaluation in the computer 25.

The circuit arrangement according to FIG. 7 permits evaluation only of the position of the register marks; a recognition or determination of the color thereof, however, is not possible. The expenditure or outlay for analog circuits employed is correspondingly smaller in comparison with that for the circuit arrangement according to FIG. 5. In the embodiment of the invention according to FIG. 7, the rectifiers 19' and 20' are full-wave rectifiers, i.e., the negative portions of the output voltages of the subtraction circuits 17 and 18 are not suppressed, but rather, inverted. The signals A' and B' then have the shape shown in FIGS. 8A to 8D. By means of threshold comparators 31 and 32, binary signals A'' and B'' are formed from the signals A' and B'. The signals A'' and B'' are fed to inputs of the computer 25, whereat the pulse center corresponding in time to the amplitude maximum (peak value) of the analog signal is then calculated. Through the use of this pulse center as a measure for the position of the register marks, no errors occur as a result of different rise or slope speeds of the pulse.

By means of FIGS. 9 and 10A to 10D, an embodiment of the invention for analyzing the signals fed to the computer 25 (FIGS. 5 and 7) is explained hereinbelow. Triangular register marks 41, 42 and 43 are provided in the interest of clarity. The signals obtained by scanning the register marks 4, 5 and 6 (FIG. 3) are analyzed or evaluated in a manner which appropriately takes into account the displacement of both halves of these register marks.

The register marks 41, 42 and 43 are respectively printed on the web, by one printing unit and in one color so that, for correct register, the marks are disposed on a dot-dash line, as shown in FIG. 9, with a defined mutual spacing S.

For different register errors, the time-dependent position of the pulse-like signals resulting from scanning the edges of the register marks 41 to 43 is represented in FIG. 10. The individual lines in FIGS. 10A to 10D, are identified in a manner corresponding to the reference numerals identifying the sensor elements 11, 21, 12 and 22.

FIG. 10A shows the time-dependent position of the pulse when no register errors are present. The diagrams according to FIG. 10B show a lateral register error, the scanned register mark in the view according to FIG. 9 lying too low. With respect to the pulses generated by the sensor elements 21 and 22, the pulses generated by the sensor elements 11 and 12 demonstrate a time-lag B. This lag B represents a measure of the size of the lateral register error.

FIG. 10C represents the conditions prevailing in the case of a lateral register error in the opposite direction, i.e., the register mark in the view of FIG. 9 is displaced upwardly. FIG. 10D shows the pulses in the case of a lateral downward register error and a diagonal or oblique register error A. The register errors in the circumferential direction are detected due to the time intervals between the scanning of the individual register marks. This is not apparent in FIGS. 10A to 10D, because only the pulses resulting from the scanning of one register mark are represented in FIGS. 10A to 10D.

The time lags A and B, as well as the unidentified time lags between two different register marks are entered into the computer 25 in a conventional manner with the aid of counters which are incremented with a frequency which is considerably higher than the repetition frequency of the pulses.

Figure 11:
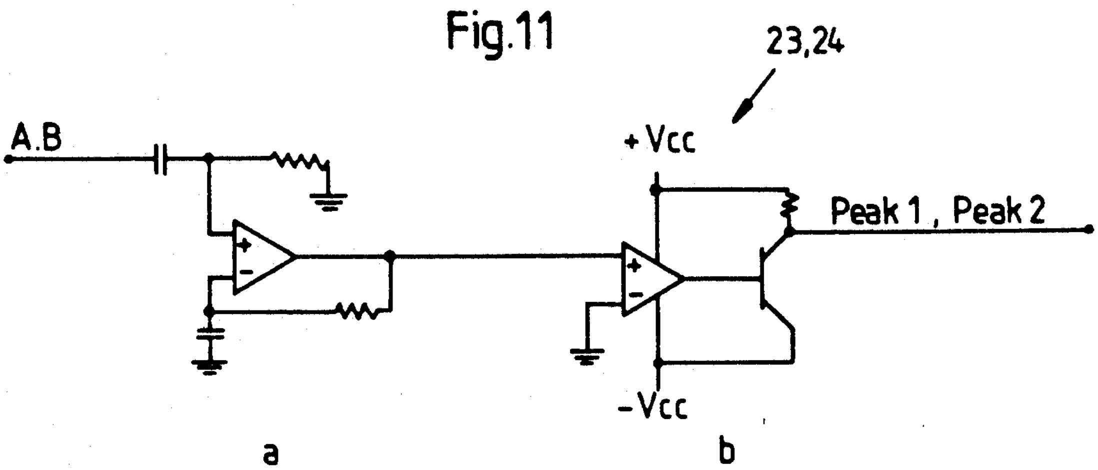
FIG. 11 is a circuit diagram of a peak detector.
Figure 12A:
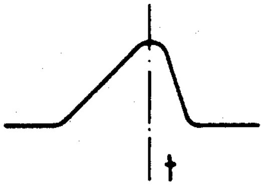
FIGS. 12A to 12C are a set of waveforms seen before, during, and after a peak detection process.
Figure 12B:
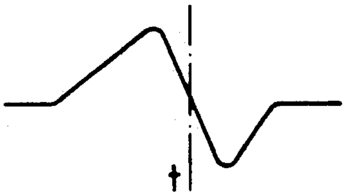
Figure 12C:
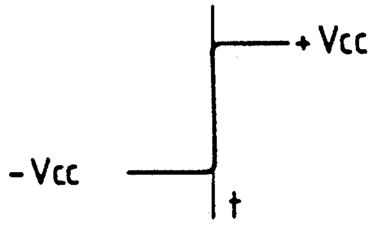

The construction of the peak value detectors 23 and 24 diagrammatically represented in FIG. 5 is shown in FIG. 11, wherein a differentiation stage a differentiates the input signal, seen in FIG. 12A, as it is generated by the rectifier stages 19 and 20. The differentiated signal is shown in FIG. 12B crossing the zero axis at time t, at the peak of the signal. A zero-crossing detector stage b, following the differentiation stage a in FIG. 11, generates at its output a logic high (i.e., a "1") as shown in FIG. 12C exactly at the time t of the zero crossing.

As shown in FIG. 5, the logic high is fed to the computer inputs PEAK1 and PEAK2 to inform the computer 25 of the exact time at which the peak values occur, and to an input of AND-gates 28 and 29, which also have a second input connected to respective outputs "convert 1", "convert 2", of the computer 25. The output of the AND-gates 28 and 29 are connected to respective analog-to-digital converters 26 and 27. When the computer 25 is ready to receive the digitized peak value of the signal, the respective computer output "convert 1", "convert 2" goes high, and when the signal actually reaches its peak value at time t, as determined by the peak detectors 23 and 24, the output of the AND-gates 28 and 29 operates to activate the respective A/D converter 26, 27 to convert the peak value of the rectifier outputs A and B to digital format which is received by the computer 25 at inputs "Data 1" and "Data 2", respectively. The actual peak value with the respective time of appearance thereof is processed in the computer 25 to determine the color which, in turn identifies the particular color printing unit, the circumferential register and the lateral register of the print.

Figure 13:
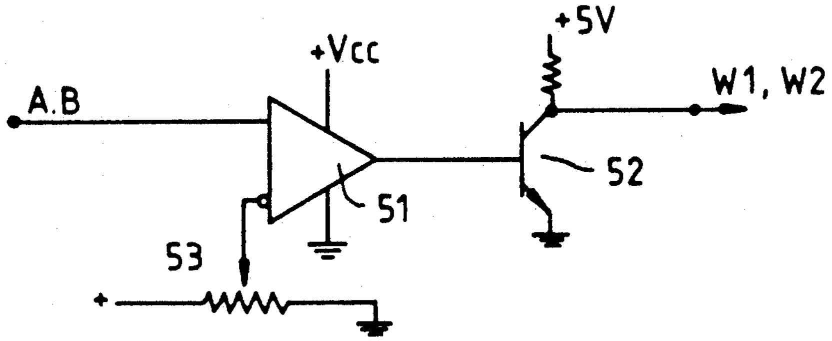
FIG. 13 is a circuit for converting an analog signal to digital format.

The AND-gates may advantageously have a third input designated W1 and W2, respectively. These inputs define the general time at which the output signal from the rectifiers 19 and 20 is present, in order to differentiate other signals, as may be caused when the actual printed image passes under the sensors 3, which causes the sensors to generate an unwanted noise signal. For that purpose, the output signal from the rectifiers 19 and 20 is converted to a logic signal in a circuit, as shown in FIG. 13, which has an analog input A, B connected to the outputs A, B of the respective rectifiers 19 and 20. The signal is converted in an amplifier stage 51 and a transistor 52 into a logical level signal, compatible with the inverted inputs W1, W2 of the AND-gates 28 and 29. A potentiometer 53 operates to bias the amplifier 51 so that only the general peak region of the signal is selected, and not the noise generated by the image information.

It should be noted that the circuits shown in FIGS. 11 and 13 are conventional and are only to be considered as examples of circuits of this type.

Figure 14:
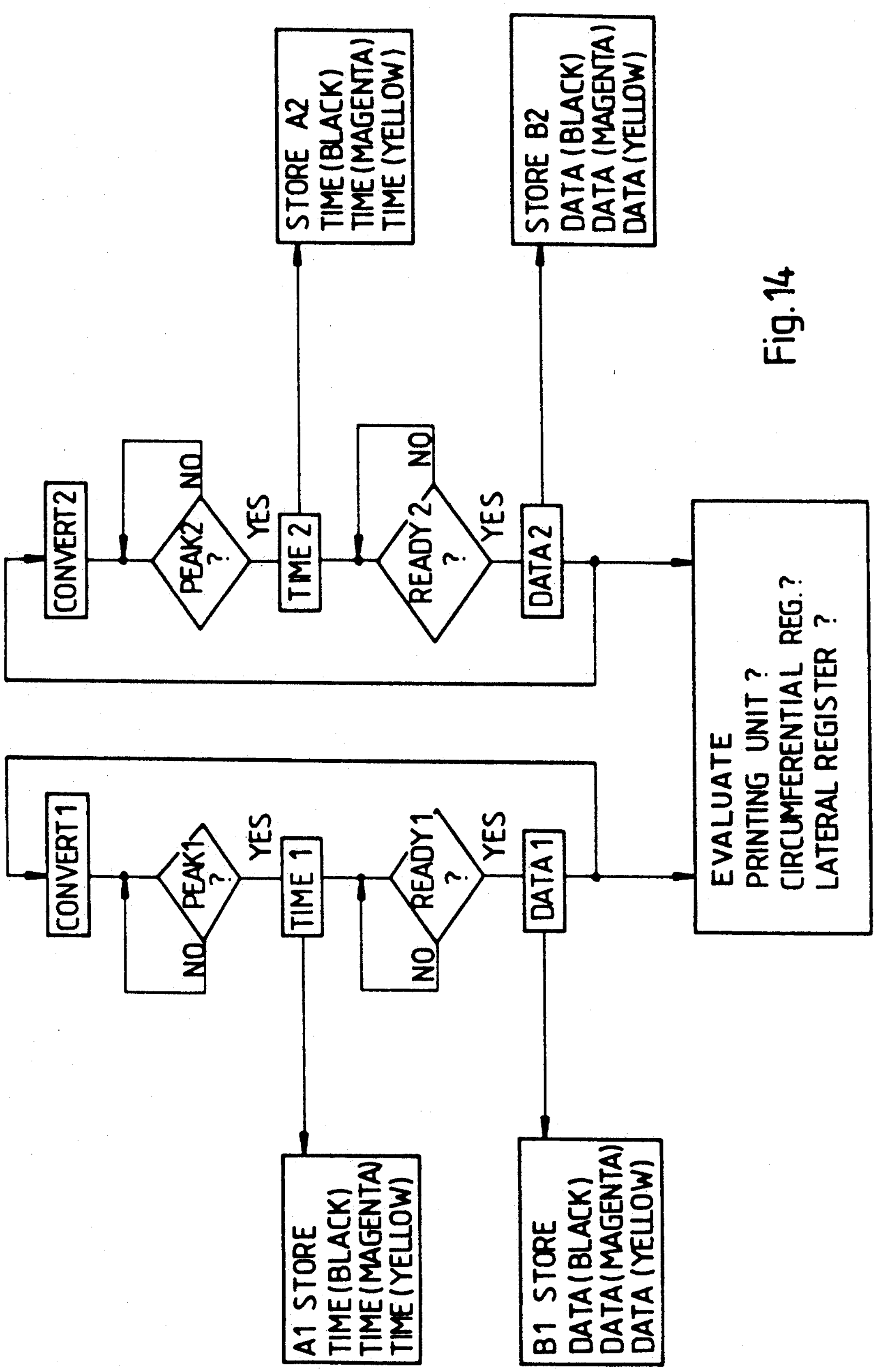
FIG. 14 is a flow chart showing the steps of determining the identity of the printing unit, the circumferential register, and the lateral register.

FIG. 14 is a self-explanatory flow-chart showing the method steps performed in the afore-described system in order to provide the data required for the computer 25 to compute the identity of the printing unit, the circumferential register and the side (i.e. "lateral") register of the respective printing unit.

We claim:

1. In a method of detecting register errors on a printed product, the improvement comprising the steps of forming register marks on the printer product, passing the printed product through a printing machine, opto-electrically scanning the register marks twice in a web travel direction with a predetermined time interval between the scannings, generating respective signals in accordance with the scannings, subtracting the signals from one another to obtain a further signal, determining the position of the register mark as a measure of a time-dependent position of a given value of the further signal selected from a group of given values consisting of a threshold value and a peak value, and comparing the given value of the further signal with stored values representing absorption coefficients of various printing inks for obtaining a result indicating the color of the respective scanned register mark.

2. In an apparatus for performing a method of detecting register errors on a printed product, the improvement comprising, in combination, means for twice scanning in a web travel direction register marks formed on the printed product and generating two signals in accordance with the scannings, means for subtracting said signals from one another and deriving a further signal therefrom, circuit means including an analog-digital converter and a peak value detector connected to respective inputs of a computer, and means for feeding said further signal to said analog-digital converter and to said peak value detector, said peak value detector being effective for emitting a pulse to said computer when said further signal reaches a peak value.

3. Apparatus according to claim 2, wherein said peak value detector has an output connected via an AND-circuit to a control input of said analog-digital converter, and said computer has an output connected to an input of said AND-circuit for feeding a start pulse thereto.

4. In an apparatus for scanning register marks, the improvement comprising, in combination, four opto-electrical sensor elements arranged in a square and disposed pairwise at a predetermined spacing from one another in a web travel direction, and means for feeding output signals of respective pairs of said sensor elements to respective subtraction circuits, said subtraction circuits, respectively, having an output connected via a rectifier to an input of a threshold comparator.

5. In a method of detecting register errors on a printed product, the improvement comprising the steps of forming register marks on the printer product with two edges extending with opposite angles obliquely to the web travel direction, the edges being offset from one another in the web travel direction, passing the printed product through a printing machine, opto-electrically scanning the register marks twice in a web travel direction with a predetermined time interval between the scannings, generating respective signals in accordance with the scannings, subtracting the signals from one another to obtain a further signal, determining the position of the register mark as a measure of a time dependent position of a given value of the further signal selected from a group of given values consisting of a threshold value and a peak value.

* * * * *